(12) United States Patent
Yamada et al.

(10) Patent No.: US 10,572,197 B2
(45) Date of Patent: Feb. 25, 2020

(54) INFORMATION PROCESSING APPARATUS AND INFORMATION PROCESSING METHOD

(71) Applicant: SEIKO EPSON CORPORATION, Tokyo (JP)

(72) Inventors: Yusuke Yamada, Shiojiri (JP); Hiroka Osano, Shiojiri (JP); Shigeo Ikeda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/128,116

(22) Filed: Sep. 11, 2018

(65) Prior Publication Data

US 2019/0079708 A1 Mar. 14, 2019

(30) Foreign Application Priority Data

Sep. 12, 2017 (JP) ................................. 2017-175034

(51) Int. Cl.
*G06F 3/12* (2006.01)
*G06Q 30/02* (2012.01)

(52) U.S. Cl.
CPC .......... *G06F 3/1219* (2013.01); *G06F 3/1256* (2013.01); *G06F 3/1263* (2013.01); *G06F 3/1272* (2013.01); *G06F 3/1273* (2013.01); *G06Q 30/0283* (2013.01)

(58) Field of Classification Search
CPC .... G06F 3/1219; G06F 3/1272; G06F 3/1273; G06F 3/1263; G06F 3/1256; G06Q 30/0283
USPC ........................................................ 358/1.15
See application file for complete search history.

(56) References Cited

U.S. PATENT DOCUMENTS

2004/0233472 A1* 11/2004 Gassho ................. G06F 11/008
358/1.15

FOREIGN PATENT DOCUMENTS

JP 2015-170216 A 9/2015

* cited by examiner

*Primary Examiner* — Benny Q Tieu
*Assistant Examiner* — Juan M Guillermety
(74) *Attorney, Agent, or Firm* — Foley & Lardner LLP

(57) ABSTRACT

The management server acquires information including, at least, a medium price per unit area of one or more types of print media and a consumption amount of one or more types of inks, regarding a print job executed by the printer, calculates a cost of the print job based on the medium price and the consumption amount included in the acquired information, and calculates an index value of a profit obtained by executing a print job, of which a product is a predetermined print medium, based on the calculated cost by the printing apparatus for a predetermined time.

16 Claims, 13 Drawing Sheets

FIG. 9

Detailed Job Info — 350

Total Media Usage 19000.25 m²    Total Ink Usage 562.33 ml — 351

Printer ▽ — 353

Period: 2016/12/5 — 2017/1/31 — 354

| Job Name | Total Cost | Media Type | Media Usage | Ink Usage | Completion Time | Job Status | User Name | Except |
|---|---|---|---|---|---|---|---|---|
| Doc1 | (¥)3021.000 | Normal | 3.50 m² | 2.20 ml | 2016/12/6 12:00:00 | Completed | User01 | ☐ |
| Doc2 | (¥)250.000 | Normal | 0.21 m² | 0.20 ml | 2016/12/8 13:00:00 | Unknown | User01 | ☑ |
| Graph01 | (¥)1020.000 | Inkjet Paper | 0.90 m² | 1.30 ml | 2016/12/10 1:00:00 | Aborted | User01 | ☑ |
| Capture00 | (¥)3000.000 | Photo Paper | 2.20 m² | 1.80 ml | 2016/12/22 00:15:00 | Completed | User01 | ☐ |
| Order10 | (¥)200.000 | Normal | 1.21 m² | 0.30 ml | 2017/1/10 12:00:00 | Completed | User01 | ☐ |

361 362 363 364 365 366 367 368 369

360 — 370

INFORMATION PROCESSING APPARATUS AND INFORMATION PROCESSING METHOD

CROSS-REFERENCE TO RELATED APPLICATIONS

This application claims priority to Japanese Appl. 2017-175034, filed Sep. 12, 2017; the contents of which are incorporated by reference herein in their entirety.

BACKGROUND

1. Technical Field

The present invention relates to an information processing apparatus and an information processing method.

2. Related Art

In recent years, there is known a method of calculating the cost of a print job executed by a printing apparatus (see, for example, JP-A-2015-170216). JP-A-2015-170216 discloses a configuration such that a printing cost of a print job based on the price per unit area of a rolled paper and the price per unit amount of ink is calculated.

By the way, in order to obtain profit appropriately in a business using printed matter as a commercial material, it is necessary to estimate the profit in consideration of the printing cost. However, in a case where a relationship between the printing cost and a selling price is complicated, such as the case where the selling price according to a type of a paper or ink is set, it is difficult to perform work or processing for estimating profit.

SUMMARY

An advantage of some aspects of the invention is to support work or processing for estimating the profit in a case where the printed matter is used as a commercial material.

According to an aspect of the invention, there is provided an information processing apparatus, including: an acquisition unit that is configured to acquire information including, at least, a medium price per unit area of one or more types of print media and a consumption amount of one or more types of inks, regarding a print job executed by a printing apparatus, and a calculation unit that is configured to calculate a cost of the print job based on the medium price and the consumption amount included in the acquired information, in which the calculation unit calculates an index value of profit obtained by executing the print job, of which a product is a predetermined print medium, based on the cost of the print job by the printing apparatus for a predetermined time.

Accordingly, it is possible to calculate an index value corresponding to the product of the printing apparatus and an operation time of the printing apparatus, and the index value is useful information for estimating profit in a case where a printed product is used as a commercial material. Therefore, it is possible to support work or processing for estimating the profit by providing useful information in a case where a printed product is used as a commercial material.

In the printing apparatus, it is preferable that as the index value, the calculation unit calculate an average value of profits per operation time of the printing apparatus in a case where the printing apparatus executes the print job.

Accordingly, since the average value of profits per operation time of the printing apparatus is calculated, it is possible to provide even more useful information.

In the printing apparatus, it is preferable that the calculation unit calculate the index value based on the selling price of the product.

Accordingly, it is possible to provide information allowing improvement of the estimation accuracy of profit, as the index value. By using the index value, it is possible to estimate profit with high accuracy.

The information processing apparatus includes a storage unit that is configured to store the information acquired by the acquisition unit, and a designation unit that is configured to perform a designation as to whether or not to use the information stored in the storage unit as a target for calculating the selling price of the product for each print job, in which the calculation unit may select a print job to be calculated according to the designation by the designation unit, and calculate the index value based on the information about the selected print job.

Accordingly, since it is possible to select a print job to be reflected in the printing cost among print jobs executed by the printing apparatus, it is possible to obtain the index value according to the intention of the user or the like that estimates the profit. As a result, it is possible to estimate the profit corresponding to the user's intention in the case where the printed product is used as a commercial material.

The information processing apparatus includes an input unit that is configured to receive an input, in which the designation unit may designate a print job not to be used for calculating the index value based on the input received at the input unit, and the calculation unit may select another print job excluding the print job designated by the designation unit, as a print job to be calculated.

Accordingly, among print jobs executed by the printing apparatus, a print job not to be reflected in the printing cost may be designated according to an input. As a result, it is possible to estimate the profit by reflecting the intention of the user or the like more clearly in the case where the printed product is used as a commercial material.

In the printing apparatus, it is preferable that the calculation unit calculate the index value for each type of print media.

Accordingly, since the index value is calculated for each type of print media used for printing, by using the index value, it is possible to estimate the profit corresponding to the type of the product in detail. Therefore, it is possible to provide more useful information about work or processing for estimating profit.

In the printing apparatus, it is preferable that the acquisition unit acquire the information including an operation time in which the print job is executed by the printing apparatus, and the calculation unit calculate an operation time for each type of print media in a predetermined period based on the information acquired by the acquisition unit, regarding the print job executed by the printing apparatus in the predetermined period.

Accordingly, since the operation time of the print job by the printing apparatus is calculated for each type of print media, by using this information, it is possible to accurately estimate the profit obtained by the printing apparatus in a case where the printing apparatus performs printing on a plurality of print media. As a result, it is possible to more effectively support the work or processing for estimating the profit in a case where the printed product is used as a commercial material.

The information processing apparatus may include an output unit that is configured to output the index value for each type of print media and the operation time for each type of print media calculated by the calculation unit in a format in association with the type of the print medium.

Accordingly, since the information such as the index value is output in the format in association with the type of a print medium, it is possible to estimate the profit based on the output information in more detail and easily, in the case where a printed product is used as a commercial material.

In the printing apparatus, it is preferable that the output unit output an image including a categorized state obtained by categorizing an operation time for each type of print media on the print job executed by the printing apparatus in the predetermined period and an index value corresponding to each of categorized times, or output display information for displaying the image.

Accordingly, it is possible to display detailed information reflecting the operation time of the printing apparatus and the type of a print medium, as an image. Therefore, it is possible to more effectively support work or processing for estimating the profit in a case where the printed product is used as a commercial material.

According to another aspect of the invention, there is provided an information processing method, including: acquiring information including, at least, a medium price per unit area of one or more types of print media and a consumption amount of one or more types of inks, regarding a print job executed by a printing apparatus, calculating a cost of the print job based on the medium price and the consumption amount included in the acquired information, and calculating an index value of profit obtained by executing the print job, of which a product is a predetermined print medium, based on the calculated cost by the printing apparatus for a predetermined time.

Accordingly, it is possible to calculate the index value corresponding to the product of the printing apparatus and the operation time of the printing apparatus, and the index value is useful information for estimating the profit in a case where a printed product is used as a commercial material. Therefore, it is possible to support work or processing for estimating the profit by providing useful information in a case where a printed product is used as a commercial material.

BRIEF DESCRIPTION OF THE DRAWINGS

The invention will be described with reference to the accompanying drawings, wherein like numbers reference like elements.

FIG. 9 is a diagram showing a job information screen as a display example of the management server.

DESCRIPTION OF EXEMPLARY EMBODIMENTS

Hereinafter, embodiments of the invention will be described with reference to the drawings.

1. Configuration of Management System

Figure 1:
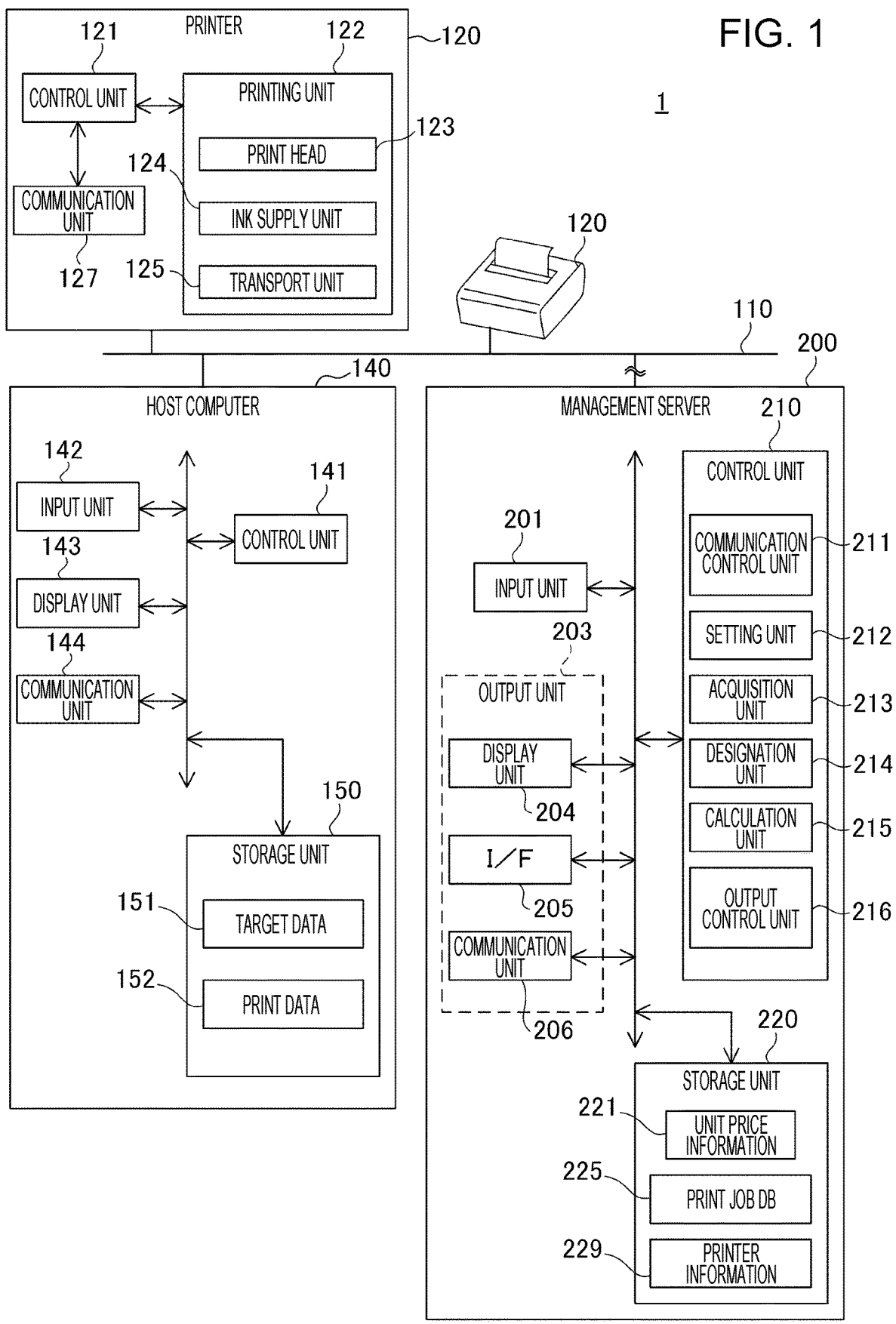
FIG. 1 is a diagram showing a configuration of a management system according to the present embodiment.

FIG. 1 is a diagram showing the configuration of the management system 1. The management system 1 includes a printer 120 (printing apparatus), a host computer 140 that controls the printer 120, and a management server 200 (information processing apparatus). FIG. 1 shows a configuration example in which the management system 1 includes two printers 120, but the number of printers 120 is optional. Also, the number of host computers 140 is optional.

The management system 1 according to the embodiment provides information about profit obtained by printing in a case where a business entity (irrespective of individuals or corporations) possessing or using the printer 120 operates a business of selling or providing printed matter (product) printed by the printer 120.

Users of the management system 1 include an operator who operates the printer 120, a user who operates or manages the management server 200, and the like, and they are generically referred to as users.

The printer 120 includes a printing unit 122 that is configured to perform printing on a print medium, and a control unit 121 that is configured to control the printing unit 122 to execute printing. In the embodiment, an ink jet type printer 120 that ejects ink onto a printed surface of a print medium is illustrated, but the printing method of the printer 120 is not particularly limited thereto. In the printer 120, an ink cartridge (not shown) that is configured to store ink is attachable or detachable, and the printing unit 122 includes an ink jet type of a print head 123 that ejects ink supplied from an ink cartridge (not shown). The printing unit 122 includes an ink supply unit 124 that supplies ink to the print head 123, and a transport unit 125 that transports the print medium.

The control unit 121 includes a processor (not shown) such as a Central Processing Unit (CPU) or a microcomputer, and controls each unit of the printer 120 by executing programs by the processor. In addition to the processor, the control unit 121 may include a Random Access Memory (RAM) (not shown), a Read Only Memory (ROM), and the like. The control unit 121 may be constituted with a semiconductor device in which these are integrated. The RAM forms a work area for temporarily storing programs executed by the processor, data to be processed, and the like. The ROM nonvolatilely stores data including a control program (firmware) executed by the processor, various set values, and the like.

The printer 120 includes a communication unit 127. The communication unit 127 is connected to the host computer 140, and receives print data output from the host computer 140. The communication unit 127 may be connected to the host computer 140 in a one-to-one manner, such as a RS-232C interface or a Universal Serial Bus (USB) interface. The communication unit 127 may include a communication interface such as Ethernet (registered trademark), and may communicate with the host computer 140 and other apparatuses through the communication network. In the embodiment, the communication unit 127 is connected to a network 110 and executes communication with the host computer 140 and the management server 200 through the network 110.

The network 110 is a wired communication network configured by Ethernet or a wireless communication network, and connects the printer 120, the host computer 140, and the management server 200 so as to communicate with one another. The network 110 may be configured by a Local Area Network (LAN) as a whole, or may include a public network or a wide area network. The network 110 may include a network equipment (not shown) such as routers and switches.

In a case where the communication unit 127 receives the print data, the control unit 121 controls the printing unit 122 according to the received print data to execute a print job. The print data may include a command to instruct printing to the printer 120, or data of an image or text to be printed, and the printer 120 may print one printed matter according to a plurality of print data.

The print job executed by the printer 120 indicates a series of operations for printing one printed matter, including, for example, operations of printing all of an image or text designated in the print data and then transporting the print medium. The number of pieces of print data constituting one print job is not limited thereto. A printed matter printed by one print job is regarded as one printed product.

In a case where the operation regarding the print job is completed, the control unit 121 reports a status of the print job to the host computer 140 which transmitted the print data. The status of the print job is, for example, a "Completed", an "Aborted", a "Canceled", an "Unknown", and the like. The "Completed" indicates that the print job is normally completed. The "Aborted" indicates that the print job has not been completed normally, for example, because the printer ran out of ink during execution of the print job, ran out of the print medium, or was clogged with the print medium, or the like. The "Canceled" indicates that the print job was canceled before or during execution. The "Unknown" indicates that the status is unknown.

The control unit 121 transmits print job information indicating an executed result of the print job to the management server 200. The contents of the print job information will be described later. The control unit 121 transmits the print job information in every completion of the print job or in a preset period.

The host computer 140 is an apparatus that controls the printer 120 to execute printing, and is, for example, a desktop type, laptop type, or tablet type personal computer. The host computer 140 may be a Point of Sales (POS) terminal device. The host computer 140 may be a dedicated computer for controlling the printer 120.

The host computer 140 includes a control unit 141, an input unit 142, a display unit 143, a communication unit 144, and a storage unit 150.

The control unit 141 includes a processor (not shown) such as a CPU, and controls each unit of the host computer 140 by executing programs by the processor. In addition to the processor, the control unit 141 may include a RAM (not shown), a ROM (not shown), and the like. The control unit 141 may be constituted with a semiconductor device in which these are integrated. The RAM forms a work area for temporarily storing programs executed by the processor, data to be processed, and the like. The ROM nonvolatilely stores data including a control program executed by the processor, various set values, and the like.

The storage unit 150 nonvolatilely stores a program executed by the control unit 141 and data processed by the control unit 141. The storage unit 150 stores target data 151 and print data 152. The target data 151 is data of an image or text printed by the printer 120. The print data 152 is data generated based on the target data 151 by the control unit 141, and is transmitted to the printer 120.

Based on the target data 151 stored in the storage unit 150, the control unit 141 generates print data 152 for causing the printer 120 to execute printing.

The print data 152 includes a command to instruct printing to the printer 120, a command to instruct transporting of a print medium, a command to instruct setting of parameters regarding printing, a command to designate a print form, and the like. The print data 152 may include parameters corresponding to a command.

The print data 152 includes data on an image or character formed by the print head 123 of the printer 120. In the embodiment, the control unit 141 generates an image of the entire printed area in which an image or character are disposed based on the target data 151, and generates the print data 152 including data on dots formed by the print head 123 in order to print the image of the entire printed area. The data on dots includes, for example, data for designating an ink ejection amount for each type of ink ejected by the print head 123. In a case where the print data 152 is transmitted to the printer 120, the control unit 121 may determine an amount of ink to be ejected from a nozzle (not shown) of the print head 123 and a position at which the ink is ejected according to the print data.

The control unit 121, for example, executes a device driver program for controlling the printer 120, thereby generating print data 152 compatible with the printer 120. In a case where the management system 1 includes a plurality of printers 120 and the respective printers 120 are different in models, the host computer 140 may execute a device driver program corresponding to at least one of models of printers 120. The host computer 140 may execute device driver programs corresponding to a plurality of models of printers 120, respectively.

In a case of generating the print data 152, the control unit 141 transmits the print data 152 to the printer 120 to execute printing. Here, the control unit 141 may designate any one of the plurality of printers 120 included in the management system 1 and transmit the print data 152 to the designated printer. The control unit 141 may specify the printer 120 to execute printing, generate the print data 152 by a device driver program compatible with this printer 120, and transmit the print data 152, continuously.

The input unit 142 is connected to input devices (not shown) such as a mouse and a keyboard, and receives inputs from these input devices. The input unit 142 outputs data indicating the received inputs to the control unit 141.

The display unit 143 is connected to a display apparatus (not shown) such as a liquid crystal display and displays various images on the display apparatus under the control of the control unit 141.

The communication unit 144 is connected to the printer 120 through the network 110. The communication unit 144 communicates with the printer 120 under the control of the control unit 141, and transmits, for example, the print data 152 to the printer 120.

2. Management Server Configuration

The management server 200 includes a control unit 210, a storage unit 220, an input unit 201, a display unit 204, an interface (I/F) 205, and a communication unit 206.

The control unit 210 includes a processor (not shown) such as a CPU, and controls each unit of the management server 200 by executing programs by the processor. In addition to the processor, the control unit 210 may include a RAM (not shown), a ROM (not shown), and the like. The control unit 210 may be constituted with a semiconductor device in which these are integrated. The RAM forms a work area for temporarily storing programs executed by the processor, data to be processed, and the like. The ROM nonvolatilely stores data including a control program executed by the processor, various set values, and the like.

The input unit 201 is connected to input devices (not shown) such as a mouse and a keyboard, and receives inputs by detecting operations of these input devices. The input unit 201 outputs data indicating the received input contents to the control unit 210.

The display unit 204 is connected to a display apparatus (not shown) such as a liquid crystal display and displays various images on the display apparatus under the control of the control unit 210.

The I/F 205 is an interface connected to storage devices (not shown) such as a USB memory or a card type storage medium. The I/F 205 outputs data to the storage devices under the control of the control unit 210. The I/F 205 is connectable to another computer. The I/F 205 may be connected to an external device by wireless communication such as Bluetooth (registered trademark).

The communication unit 206 is connected to the printer 120 through the network 110. The communication unit 144 communicates with the printer 120 under the control of the control unit 141, and receives, for example, information transmitted from the printer 120. The communication unit 206 may communicate with the host computer 140 through the network 110.

Any one of the display unit 204, the I/F 205, and the communication unit 206 may function as an output unit 203. That is, the control unit 210 may use any of the output unit 203 in a case where data for displaying profit are output by operations as described later with reference to FIG. 11.

By executing a program, the control unit 210 configures various functional units by cooperation between software and hardware. Specifically, the control unit 210 includes a communication control unit 211, a setting unit 212, an acquisition unit 213, a designation unit 214, a calculation unit 215, and an output control unit 216, and these functional units are realized by executing the program.

The storage unit 220 nonvolatilely stores a program executed by the control unit 210 and data processed by the control unit 210. The storage unit 220 stores unit price information 221, a print job database (DB) 225, and printer information 229.

The unit price information 221 includes a unit price of ink or a print medium. The print job DB 225 is a database including a part of the storage area of the storage unit 220 and stores a plurality of records regarding the print job executed by the printer 120. Here, since it is sufficient that the print job DB 225 may be accessed by the control unit 210, for example, a database server (not shown) outside the management server 200 may have a configuration including a print job DB 225. The printer information 229 includes information about the type of ink, the type of a print medium, and the like usable by the printer in association with the model of the printer. The information included in the printer information 229 is not limited to the information corresponding to the model of the printer 120 included in the management system 1. For example, the printer information 229 may include information about a model not included in the management system 1.

The communication control unit 211 controls the communication unit 206 to execute data communication with the printer 120. The communication control unit 211 receives the print job information transmitted from the printer 120 by the communication unit 206 and temporarily stores the print job information.

The setting unit 212, the acquisition unit 213, the designation unit 214, the calculation unit 215, and the output control unit 216 are functional units for a function that analyzes the print job executed by the printer 120 in the management server 200. More specifically, the management server 200 executes processing of calculating a cost of the print job executed by the printer 120. Furthermore, the management server 200 calculates an index value of profit obtained by executing the print job, of which a product is a predetermined print medium, by the printer 120 for a predetermined time. For this processing, each functional unit of the control unit 210 is used.

In a case where an input for a setting regarding the operation of the management server 200 is performed based on an operation of the input unit 201 or data received by the communication unit 206, the setting unit 212 executes the setting based on the input. Specifically, in a case where a unit price of the print medium or a unit price of the ink used for calculating the cost of the print job are set, the setting unit 212 generates the unit price information 221 including the set unit prices, stores the unit price information in the storage unit 220, and updates the unit price information 221.

The setting unit 212 executes a function to support setting an input, for example, by displaying a unit price settings screen 300 (FIG. 2 and FIG. 3) as described later.

The acquisition unit 213 acquires information used for calculating the printing cost or the index value of profit of the printer 120. The information acquired by the acquisition unit 213 includes, at least, the medium price per unit area of one or more types of print media and the consumption amount of one or more types of inks, regarding the print job executed by the printer 120. Specifically, the print job information transmitted from the printer 120 corresponds to this information. In a case where the print job information is included in the information received and temporarily stored by the communication control unit 211, the acquisition unit 213 acquires the print job information.

The designation unit 214 designates a print job to be used or a print job not to be used for calculating a printing cost and calculating an index value of profit, among the information acquired by the acquisition unit 213, regarding the print job executed by the printer 120. The designation unit 214 supports an input for designating a print job by causing the display unit 204 to display, for example, a job information screen 350 (FIG. 9) as described later. The designation unit 214 designates a print job according to the input detected by the input unit 201.

The calculation unit 215 calculates the printing cost or the index value of profit based on the information of a print job designated by the designation unit 214 or the information excluding the designated print job, among information included in the print job DB 225.

The output control unit 216 outputs data on the printing cost and the index value of profit calculated by the calculation unit 215. The output control unit 216 outputs data of the processing result of the calculation unit 215 by the display unit 204, the I/F 205, or the communication unit 206 constituting the output unit 203. The output control unit 216 outputs display information (display data) for displaying the processing result of the calculation unit 215 as an image.

Figure 2:
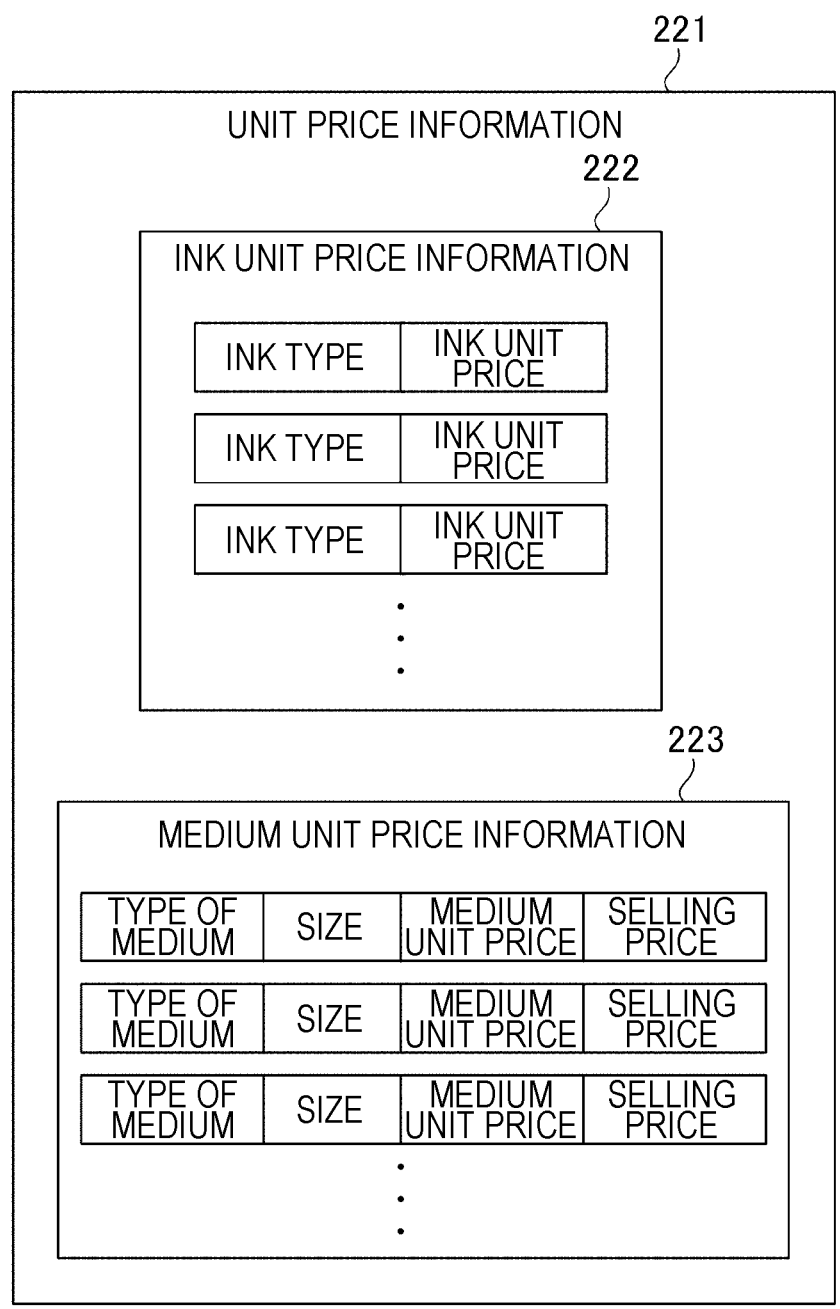
FIG. 2 is a schematic diagram showing a configuration example of unit price information.

FIG. 2 is a schematic diagram showing a configuration example of the unit price information 221 stored in the storage unit 220.

As shown in FIG. 2, the unit price information 221 according to the embodiment includes ink unit price information 222 and medium unit price information 223.

The ink unit price information 222 includes a unit price (ink unit price) of ink corresponding to the type of ink. As shown in FIG. 2, the ink unit price information 222 may include ink unit prices for a plurality of ink types, and may include, for example, an ink unit price corresponding to the type of ink not used for the printer 120.

The ink unit price included in the ink unit price information 222 is an amount of money obtained by converting an amount of money (also referred to as an ink procurement cost) required for a business entity using the printer 120 to purchase ink, into a unit price per unit amount of ink. The ink unit price corresponds to a cost price for the business entity using the printer 120.

The medium unit price information 223 includes a unit price (medium unit price) of the print medium and a selling price in association with the type of print medium.

The medium unit price included in the medium unit price information 223 is an amount of money obtained by converting an amount of money (also referred to as a medium procurement cost) required for a business entity using the printer 120 to purchase a print medium, into a unit price per unit amount of the print medium. The medium unit price corresponds to a cost price for the business entity using the printer 120. In contrast, the selling price is an amount of money obtained by the business entity using the printer 120 in return for sales or provision of the product, and corresponds to revenue (sales) for the business entity using the printer 120.

In an example described in the embodiment, the medium procurement cost of the print medium varies depending on both the material and the size of the print medium. The material of the print medium means a material constituting the print medium, such as a paper, a special paper with coating, a fabric, and a sheet of synthetic resin. A specific example includes a plain paper, an ink jet paper, a photo paper, a canvas fabric, a tent fabric, a knitted fabric, a tarpaulin, a polyester fabric and the like. In the following description, the material of the print medium is referred to as the "type" of the print medium.

The size of the print medium is determined depending on the size of the print medium to be purchased (procured) by the business entity using the printer 120.

The business entity using the printer 120 sets a selling price so as to obtain profit in consideration of a medium procurement cost for each type of print media and each size of print media.

The categorization of selling prices may be optionally set by the business entity, the selling price may be set for each type of print media, or the selling price may be categorized according to the type and size of the print medium. The control unit 210 may detect a method of categorizing selling prices or a mode of categorization by the medium unit price information 223. The medium unit price information 223 may include information indicating the method of categorizing the selling prices or the mode of categorization.

The control unit 210 generates the ink unit price information 222 and the medium unit price information 223 based on an input received by the input unit 201 or information acquired from the I/F 205 or the communication unit 206 by the control unit 210.

Figure 3:
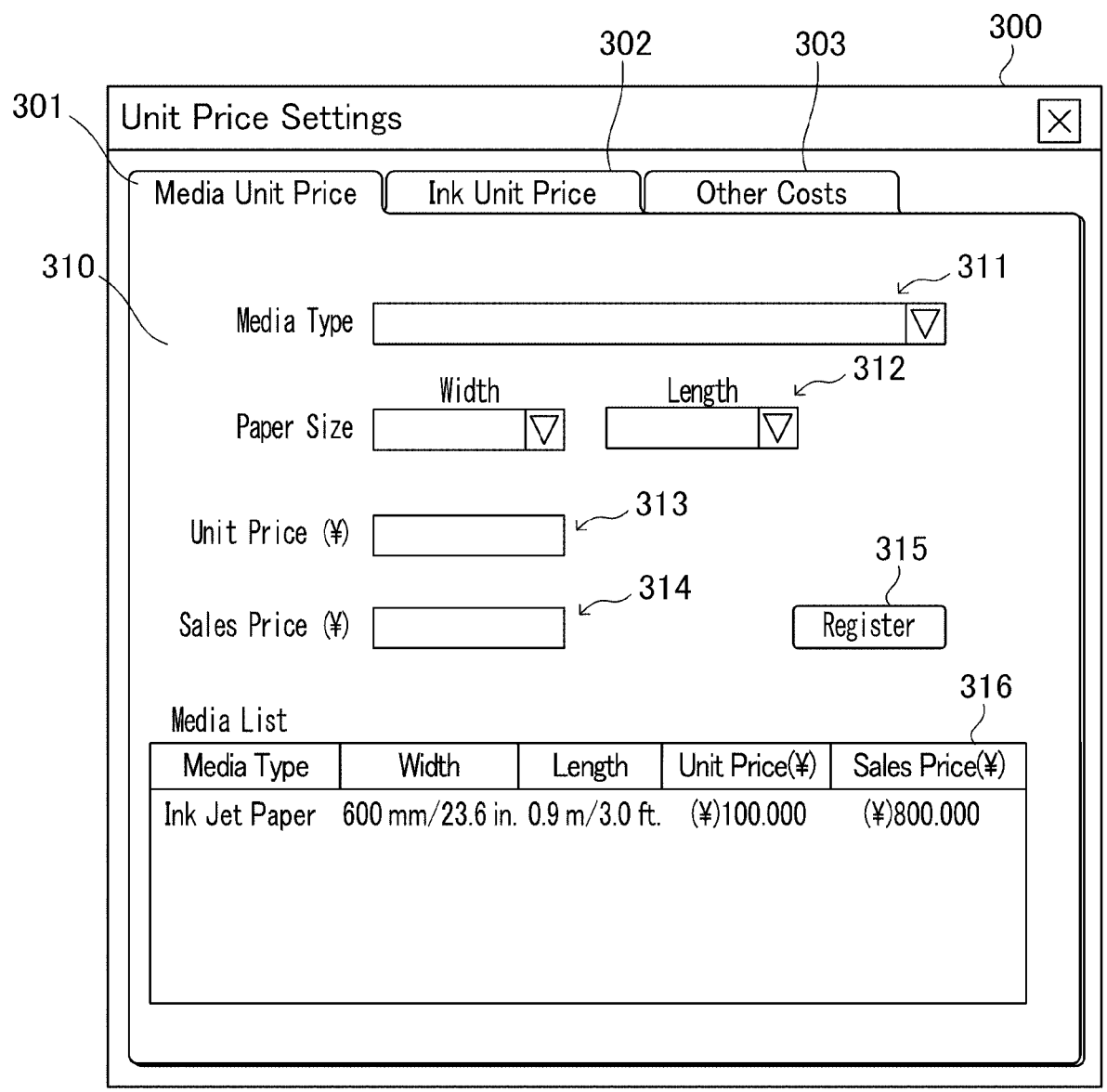
FIG. 3 is a diagram showing a unit price settings screen as a display example of a management server.
Figure 4:
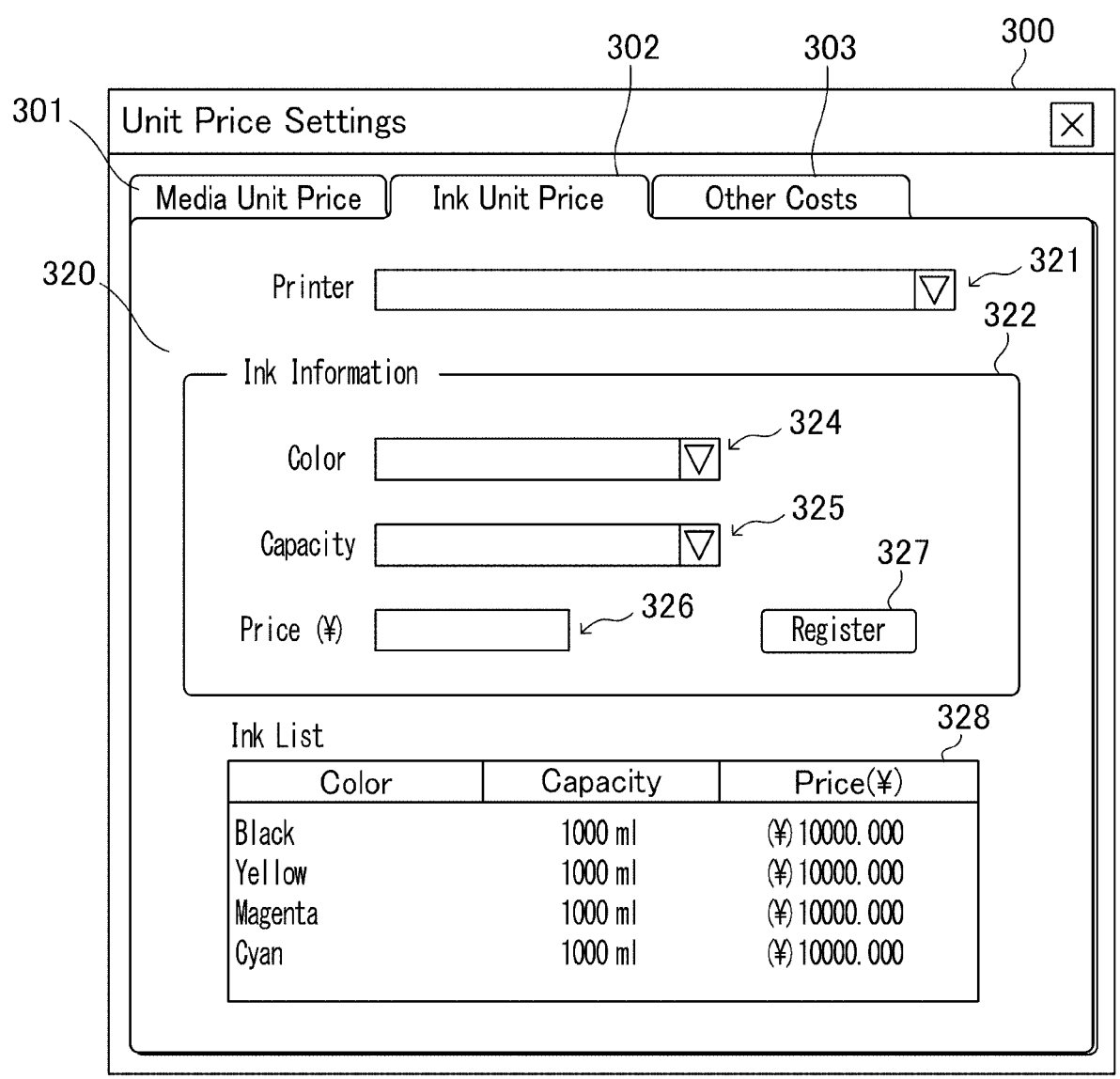
FIG. 4 is a diagram showing a unit price settings screen as a display example of a management server.

FIGS. 3 and 4 are diagrams showing a unit price settings screen 300 as a display example of the management server 200.

The unit price settings screen 300 is displayed on the display unit 204 under the control of the control unit 210 in a case where an input regarding the unit price is performed.

The unit price settings screen 300 has a medium unit price tab 301, an ink unit price tab 302, and other costs tab 303, and the control unit 210 switches a configuration of the screen according to an operation on these tabs.

In a case where the medium unit price tab 301 is selected, the medium unit price setting section 310 is displayed on the unit price settings screen 300 as shown in FIG. 3. The medium unit price setting section 310 is an area for entering information about the unit price of the print medium and includes input boxes 311, 312, 313, and 314. The type of the print medium (Media Type) is input to the input box 311. The size of the print medium (Paper Size) is input to the input box 312. In the example of FIG. 3, the input box 312 includes an input box for entering a width of the print medium and an input box for entering a length of the print medium.

The unit price of the print medium (Unit Price) is input to the input box 313. The unit price input to the input box 313 is a value obtained by converting the medium procurement cost into the amount of money per unit amount of the print medium. The selling price (Sales Price) of the product is input to the input box 314. The selling price is a value obtained by converting a return set by the business operator using the printer 120 into the amount of money per unit amount of the print medium. Here, the type and size of the print medium may be also selected from previously prepared candidates, and the input box 311 and the input box 312 may be formed with a pull-down menu for selection.

A register button 315 is disposed in the medium unit price setting section 310. In response to the operation of the register button 315, the control unit 210 registers the contents input to the input boxes 311, 312, 313, and 314 in association with one another in the medium unit price information 223.

The registered information is displayed in a list form on the medium list display section 316 disposed in the medium unit price setting section 310. The type, size (width and length), unit price, and selling price of the print medium are associated with one another and displayed in the medium list display section 316.

In a case where the ink unit price tab 302 is operated, a screen for entering ink information is displayed on the unit price settings screen 300 as shown in FIG. 4.

The ink unit price setting section 320 is displayed on the unit price settings screen 300 in FIG. 4. The ink unit price setting section 320 includes a printer designation section 321 for entering the model of the printer, an ink information input section 322 for entering a unit price for each type of inks, and an ink list display section 328.

In response to an input of the printer designation section 321, the control unit 210 sets the ink information input section 322 in a state where an input regarding ink corresponding to a model input to the printer designation section 321 may be performed.

The ink information input section 322 includes input boxes 324, 325, and 326 and a register button 327. A color of ink (Color) is input to the input box 324, a capacity of the ink cartridge (Capacity) is input to the input box 325, and a unit price of ink (Price) is input to the input box 326.

There is no particular limitation on the type of ink that may be managed by the management server 200, and information about many types of ink may be input in the ink information input section 322. In order to support input by the user, the management server 200 forms the input box 324 with a pull-down menu for selecting an ink type (color) from a predetermined number of candidates. The type of ink displayed at the pull-down menu is a type corresponding to the model of the printer input to the printer designation section 321. The control unit 210 acquires the type of ink corresponding to the model of the printer based on the printer information 229 (FIG. 1), and reflects the acquired result on the display of the input box 324.

Since the ink procurement cost often varies depending on the capacity of the ink cartridge, the capacity of the ink cartridge may be input to the input box 325. That is, for the management server 200, the ink unit price may be input and set for each capacity of the ink cartridges for the same type (color) of ink.

The unit price input to the input box 326 is an amount of money obtained by converting the ink procurement cost into a unit price per unit amount of ink as described above.

In response to the operation of the register button 327, the control unit 210 registers the contents input to the input boxes 324, 325, and 326 in association with one another in the ink unit price information 222.

On the ink list display section 328, the registered information is displayed in a list form. The type of ink (color), the capacity of the ink cartridge, and the unit price are associated with one another and displayed on the ink list display section 328.

In a case where an operation on other costs tab 303 is performed on the unit price settings screen 300, it is possible to set costs excluding costs of ink and a print medium, which are costs required for printing. These costs are referred to as other costs in the following description. Other costs include, for example, the cost of an expendable item excluding the ink and the print medium used by the printer 120, the cost for maintenance including inspection of the printer 120, and the cost required for operating the printer 120 such as an electricity charge. These costs are appropriately input and set according to the needs of the business entity using the printer 120, and the set information is stored in the storage unit 220.

Figure 5:
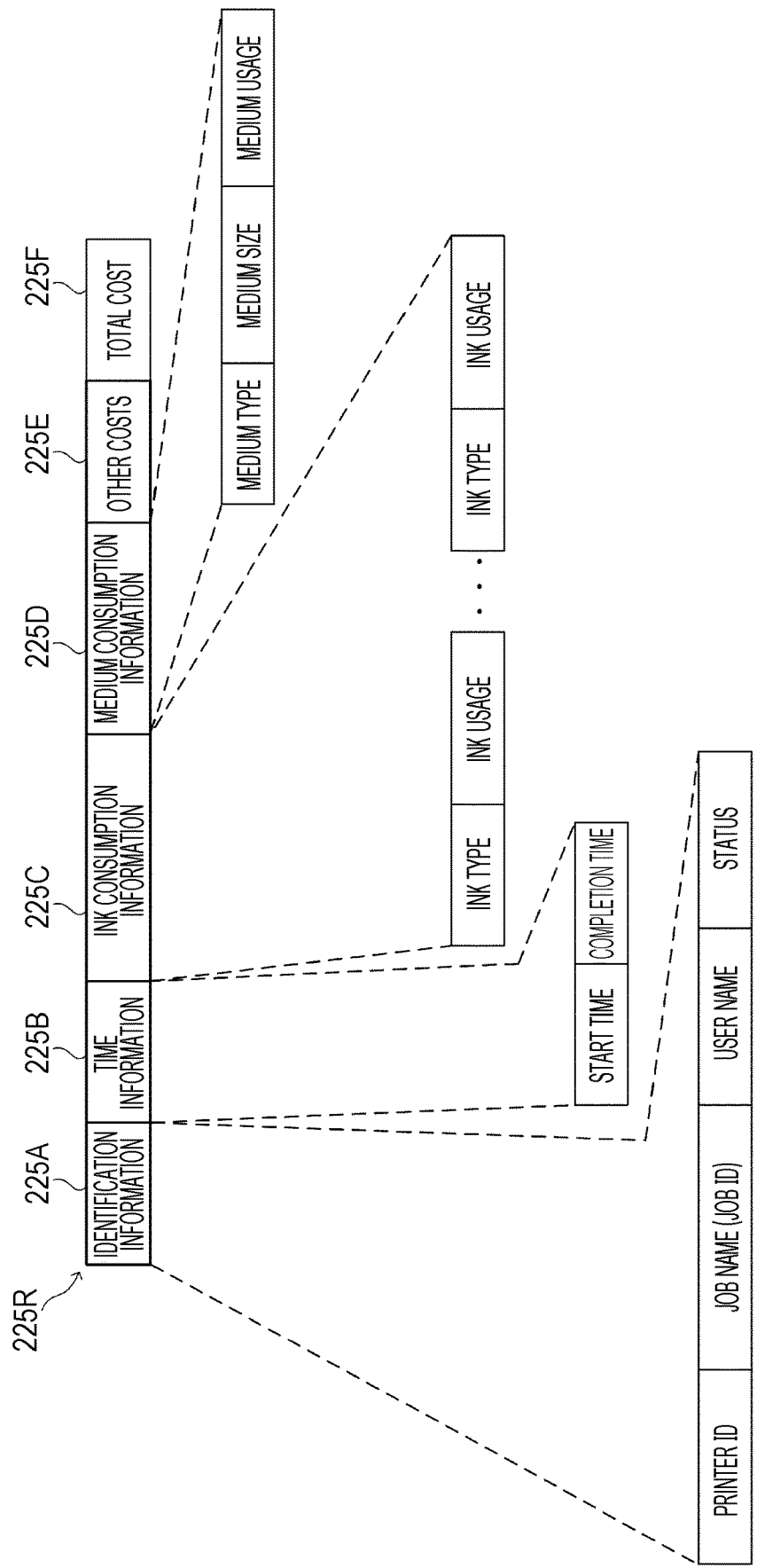
FIG. 5 is a schematic diagram showing a configuration example of a record stored in a print job DB.

FIG. 5 is a schematic diagram showing a configuration example of a record 225R registered in the print job DB 225.

Each record 225R registered in the print job DB 225 includes information about one print job executed by the printer 120. The record 225R includes an identification information field 225A, a time information field 225B, an ink consumption information field 225C, a medium consumption information field 225D, other costs field 225E, and a total cost field 225F.

The information stored in the identification information field 225A includes a printer ID for identifying the printer 120 which executed the print job, a job name for identifying the print job, a user name for identifying the user who executed the print job, and a status of the print job. The printer ID may be a name as long as the management server 200 uniquely identifies one printer 120 from all the connectable printers 120. The job name is a name or identification code assigned by the printer 120 or the host computer 140 that generated print data for the print job. The job name may be information that may specify a print job in combination with the printer ID. The user name is a staff name of a business entity designated as an administrator of the printer 120. The user name may be an ID or a code. The user name may be set in the printer 120, or may be included in the print data transmitted from the host computer 140 to the printer 120. As described above, the status indicates the executed result of the print job.

The management server 200 may configure the print job DB 225 for each printer 120. That is, the information of a plurality of printers 120 may be collectively stored in one print job DB 225, or a plurality of print jobs DB 225 corresponding to respective printers 120 connected to the management server 200 may be stored in the storage unit 220. In a case where the print job DB 225 is classified for each printer 120, it is not necessary to store the printer ID from the print job DB 225.

A start time and a completion time of the print job are stored in the time information field 225B. The start time and a time for executing the print job may be stored in the time information field 225B.

The ink type and the ink usage are associated with each other and stored in the ink consumption information field 225C. The ink consumption information field 225C includes ink usage for at least some inks, preferably inks of all the colors, used (consumed) in the print job.

The medium consumption information field 225D includes the type of the print medium (Medium Type), the size of the print medium (Medium Size), and the usage for the print medium (Medium Usage), used in the print job.

The information indicating other costs is stored in other costs field 225E. The total cost, which is the sum of the costs required for the print job of the record 225R, is stored in the total cost field 225F. The total cost is calculated by the control unit 210 according to processing as described later.

The information stored in the identification information field 225A, the time information field 225B, the ink consumption information field 225C, and the medium consumption information field 225D out of the record 225R, may be acquired or generated from the printer 120. In the embodiment, the printer 120 generates and transmits print job information about the print job, and the management server 200 acquires the print job information and stores the print job information in the record 225R.

3. Operation of Management System

Figure 6:
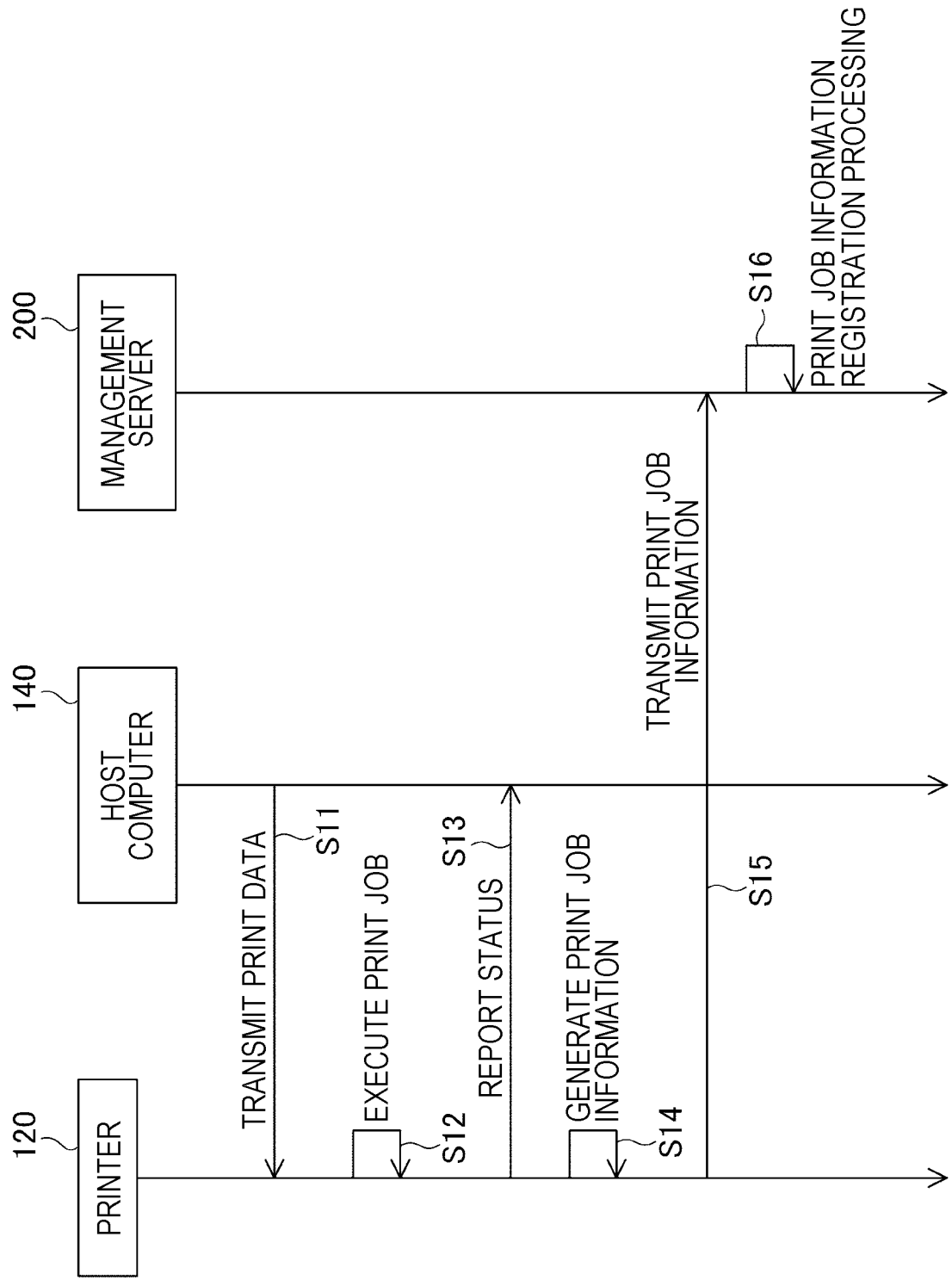
FIG. 6 is a sequence diagram showing an operation example of the management system.

FIG. 6 is a sequence diagram showing an operation example of the management system 2.

In a case where the host computer 140 generates the print data 152 based on the target data 151 and transmits the print data to the printer 120 (step S11), and the printer 120 receives the print data 152 and executes the print job (step S12).

After executing the print job, the printer 120 reports the status of the print job to the host computer 140 (step S13). In a case where the print job is canceled or suspended by, for example, an operation of an operation panel (not shown) of the printer 120 or a command input from the host computer 140, the printer 120 performs reporting in step S13 after stopping the printing unit 122.

The printer 120 generates print job information (step S14) and transmits the print job information to the management server 200 (step S15). The printer 120 may perform the operation in step S15 each time a print job is executed. The printer 120 temporarily stores the print job information generated in step S14, and transmits the stored print job information to the management server 200 together in a preset period (step S15).

The management server 200 receives the print job information transmitted from the printer 120, generates information based on the received print job information, and registers the information in the print job DB 225 (step S16). The print job information registration processing executed in step S16 will be described later with reference to FIG. 8.

Figure 7:
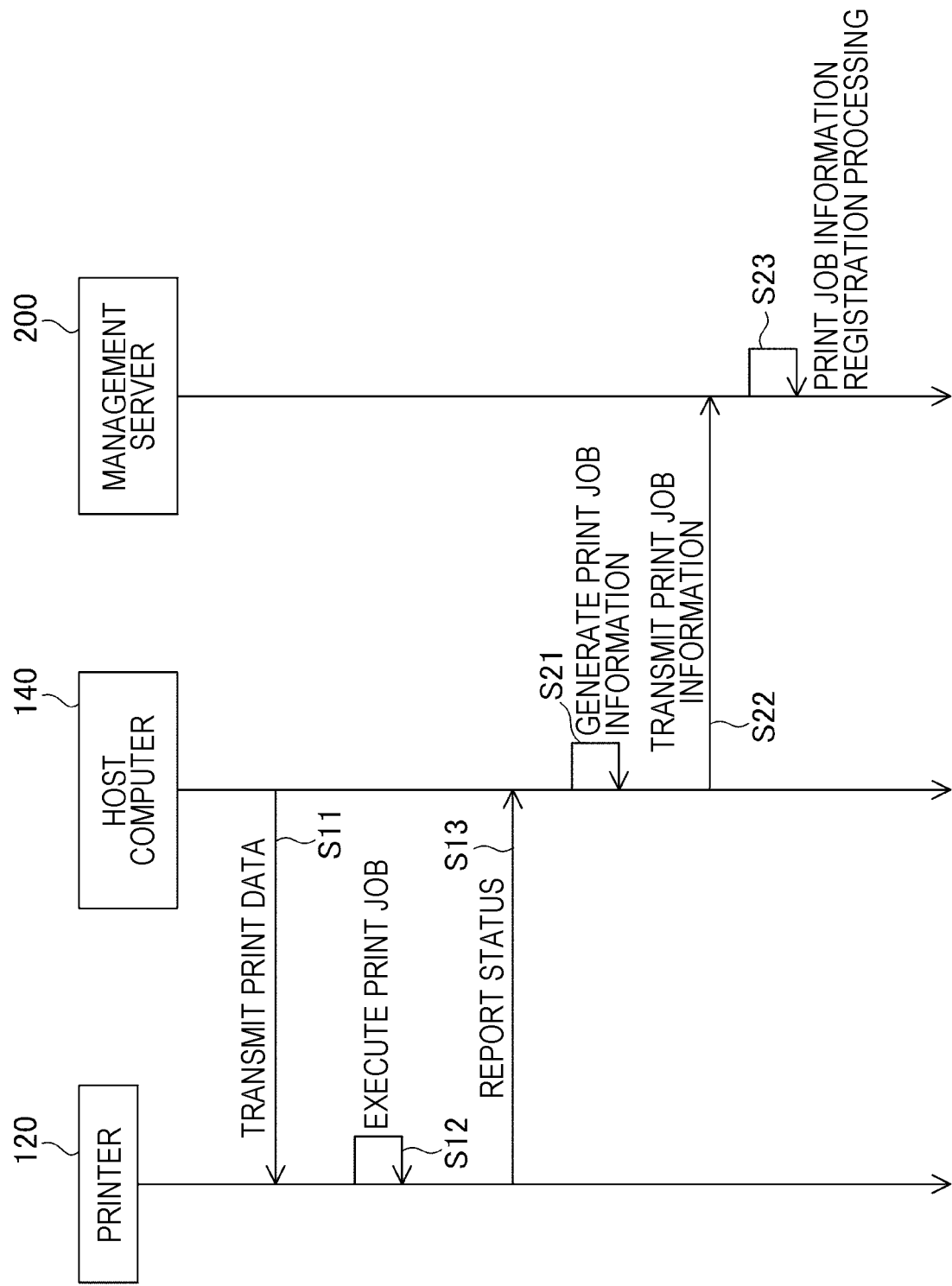
FIG. 7 is a sequence diagram showing another operation example of the management system.

FIG. 7 is a sequence diagram showing another operation example of the management system 2.

In the sequence diagram (FIG. 6), there is shown an operation example in which the printer 120 transmits the print job information, but the host computer 140 may transmit the print job information to the management server 200.

In another operation example of FIG. 7, after the printer 120 reports the status of the print job (step S13), the host computer 140 generates print job information (step S21) and transmits the print job information to the management server 200 (step S22). In this case, the printer 120 may transmit information indicating the start time and the completion time of the print job together with the status of the print job in step S13.

The management server 200 receives the print job information transmitted from the printer 120, generates information based on the received print job information, and registers the information in the print job DB 225 (step S23). The print job information registration processing in step S23 is similar to the processing in step S16.

In this manner, the print job information about the print job executed by the printer 120 may be generated by the printer 120 and transmitted to the management server 200, or may be generated and transmitted by the host computer 140. The printer 120 may generate the print job information and transmit the print job information through the host computer 140 to the management server 200, and finally the management server 200 may acquire the print job information.

4. Operation of Management Server

Figure 8:
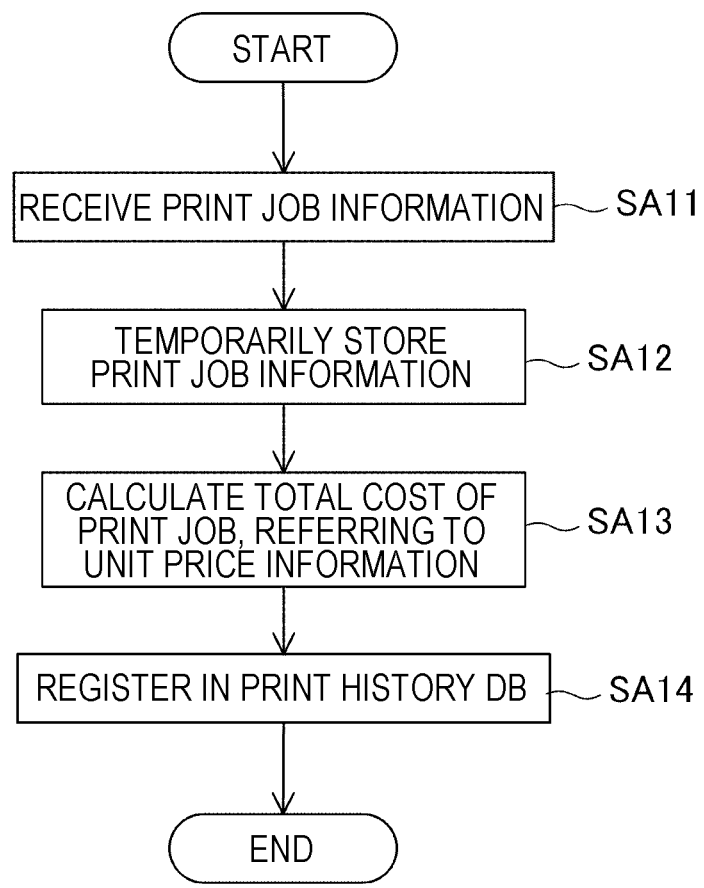
FIG. 8 is a flowchart showing the operation of the management server.

FIG. 8 is a flowchart showing operations of the management server 200 and illustrates the print job information registration processing of step S16 (FIG. 6) and step S23 (FIG. 7).

In the control unit 210, the communication control unit 211 receives the print job information (step SA11), and the acquisition unit 213 acquires the received print job information and temporarily stores the print job information (step SA12). Referring to the unit price information 221, the calculation unit 215 calculates the total cost of the print job based on the temporarily stored print job information (step SA13).

In step SA13, referring to an ink unit price of the ink unit price information 222 from the type of ink included in the print job information, the calculation unit 215 calculates an ink cost based on the ink unit price and ink usage included in the print job information. Referring to a medium unit price of the medium unit price information 223 from the type of medium and the medium size included in the print job information, the calculation unit 215 calculates a medium cost based on the medium unit price and medium usage included in the print job information. Here, the calculation unit 215 may calculate or acquire other costs based on the information about other costs stored in the storage unit 220. The calculation unit 215 calculates the total cost obtained by adding the ink cost, the medium cost, and other costs.

The control unit 210 generates data (for example, record 225R in FIG. 5) including the total cost calculated by the calculation unit 215, and registers the data in the print job DB 225 (step SA14).

In this manner, the management server 200 registers information including the total cost in the print job DB 225 as information about the print job executed by the printer 120.

FIG. 9 is a diagram showing a job information screen 350 as a display example of the management server 200. The job information screen 350 is a screen which the management server 200 displays based on the data stored in the print job DB 225.

The job information screen 350 is a screen for displaying the result of processing including collection and/or analysis of information about a print job executed by the printer 120, regarding any one of the printers 120 connected to the management server 200.

Therefore, a printer designation section 353 for designating the printer 120 is disposed on the job information screen 350. The printer designation section 353 is configured with, for example, a pull-down menu as long as the printer 120 to be displayed is selected and designated from candidates.

The control unit 210 searches the print job DB 225 for the printer 120 to be displayed designated by the printer designation section 353 and displays the total amount of the print medium and ink used in the printer 120 to be displayed in the total information display section 351.

A period designation section 354 for designating the period of the print job to be collected and analyzed in the information of the print job DB 225 is disposed on the job information screen 350. The period designation section 354 is configured with, for example, an input box or the like as long as a target period is designated.

The control unit 210 extracts, from the print job DB 225, the record 225R regarding the print job (started and completed) executed within a period designated by the period designation section 354, and sets it as a record to be processed.

The job information display section 360 disposed on the job information screen 350 displays a list of the records 225R narrowed-down in a period of the period designation section 354. In the job information display section 360, these pieces of information included in the record 225R and information calculated based on this information are displayed.

Specifically, the job information display section 360 includes a job name display section 361, a total cost display section 362, a media type display section 363, a media usage display section 364, an ink usage display section 365, a print completion time display section 366, a status display section 367, and a user name display section 368. The job information display section 360 is provided with an except setting section 369, and in the except setting section 369, a check box 370 associated with each job is disposed.

The control unit 210 displays the job name and the user name included in the identification information field 225A (FIG. 5) in the job name display section 361 and the user name display section 368, respectively. The total cost included in the total cost field 225F (FIG. 5) is displayed in the total cost display section 362. The type of medium and the medium usage included in the medium consumption information field 225D (FIG. 5) are displayed in the media type display section 363 and the media usage display section 364, respectively.

In the ink usage display section 365, there is displayed an amount obtained by adding ink usage for all the colors by the calculation unit 215, regarding the ink usage for each ink type included in the ink consumption information field 225C (FIG. 5).

In the print completion time display section 366, there is displayed the completion time included in the time information field 225B (FIG. 5), and in the status display section 367, there is displayed the status included in the identification information field 225A.

In this manner, in the job information display section 360, information about print jobs corresponding to conditions designated by the printer designation section 353 and the period designation section 354 is displayed for each print job.

In a case where an operation for designating any one of the print jobs displayed on the job information display section 360 is performed, the control unit 210 causes the display unit 204 to display a job detailed information screen 380 including detailed information about the designated print job.

Figure 10:
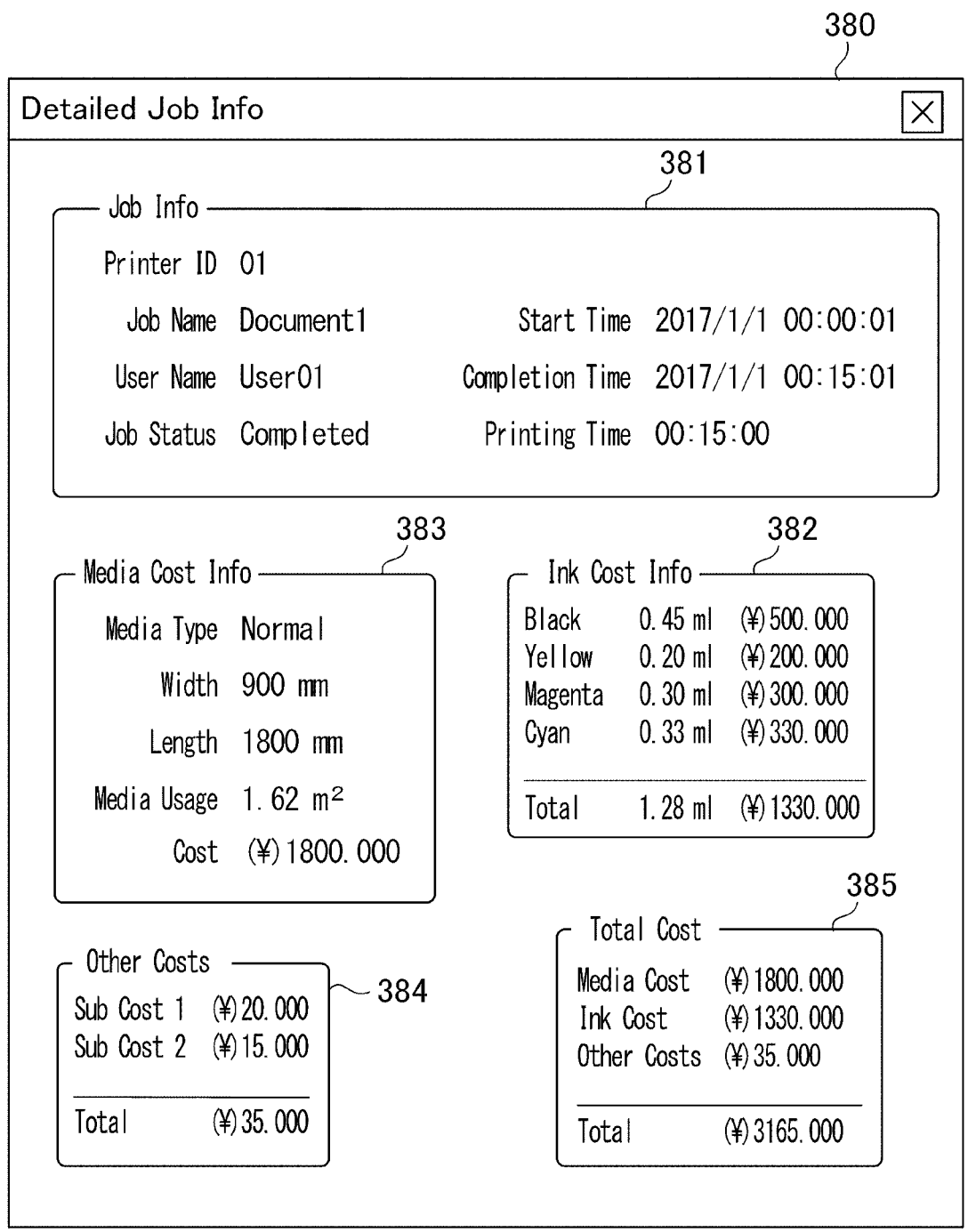
FIG. 10 is a diagram showing a job detail information screen as a display example of the management server.

FIG. 10 is a diagram showing the job detailed information screen 380 as a display example of the management server 200. As shown in FIG. 10, the job detailed information screen 380 includes a job information display section 381, an ink consumption information display section 382, a medium consumption information display section 383, other costs display section 384, and a total cost display section 385.

The control unit 210 displays the information included in the identification information field 225A, such as the printer ID, the job name, the user name, and the status of the printer 120 in the job information display section 381. Furthermore, the control unit 210 displays the start time and the completion time stored in the time information field 225B and the printing time (Printing Time) calculated from the start time and the completion time in the job information display section 381. Here, the printing time is an execution time for executing the print job and may be referred to as an operation time of the printer 120.

In the ink consumption information display section 382, the control unit 210 displays the ink type and the ink usage stored in the ink consumption information field 225C, and the ink cost calculated by the calculation unit 215 from these pieces of information and the ink unit price information 222.

In the medium consumption information display section 383, the control unit 210 displays the type of medium, the medium size, and the medium usage stored in the medium consumption information field 225D, and the medium cost calculated by the calculation unit 215 from these pieces of information and the medium unit price information 223.

In the other costs display section 384, the control unit 210 displays other costs stored in the other costs field 225E. Furthermore, in the total cost display section 385, the control unit 210 displays the medium cost, the ink cost, other costs, and the total cost obtained by adding these costs by the calculation unit 215. As the total cost, the information included in the total cost field 225F may be displayed.

The management server 200 analyzes the information stored in the print job DB 225 by executing analysis processing and has a function to provide information about the profit obtained by operating the printer 120. As a result of the analysis processing, the management server 200 comprehensively analyzes the selling price, the printing cost, and the printing time of the product as will be described later with reference to FIG. 11, and outputs the analysis result. In the analysis processing, the information of the print job DB 225 is used in a case where the selling price of the product is calculated, but it is not necessary to use the information of all print jobs.

In the job information display section 360 of FIG. 9, a check box 370 is disposed in the except setting section 369.

Figure 11:
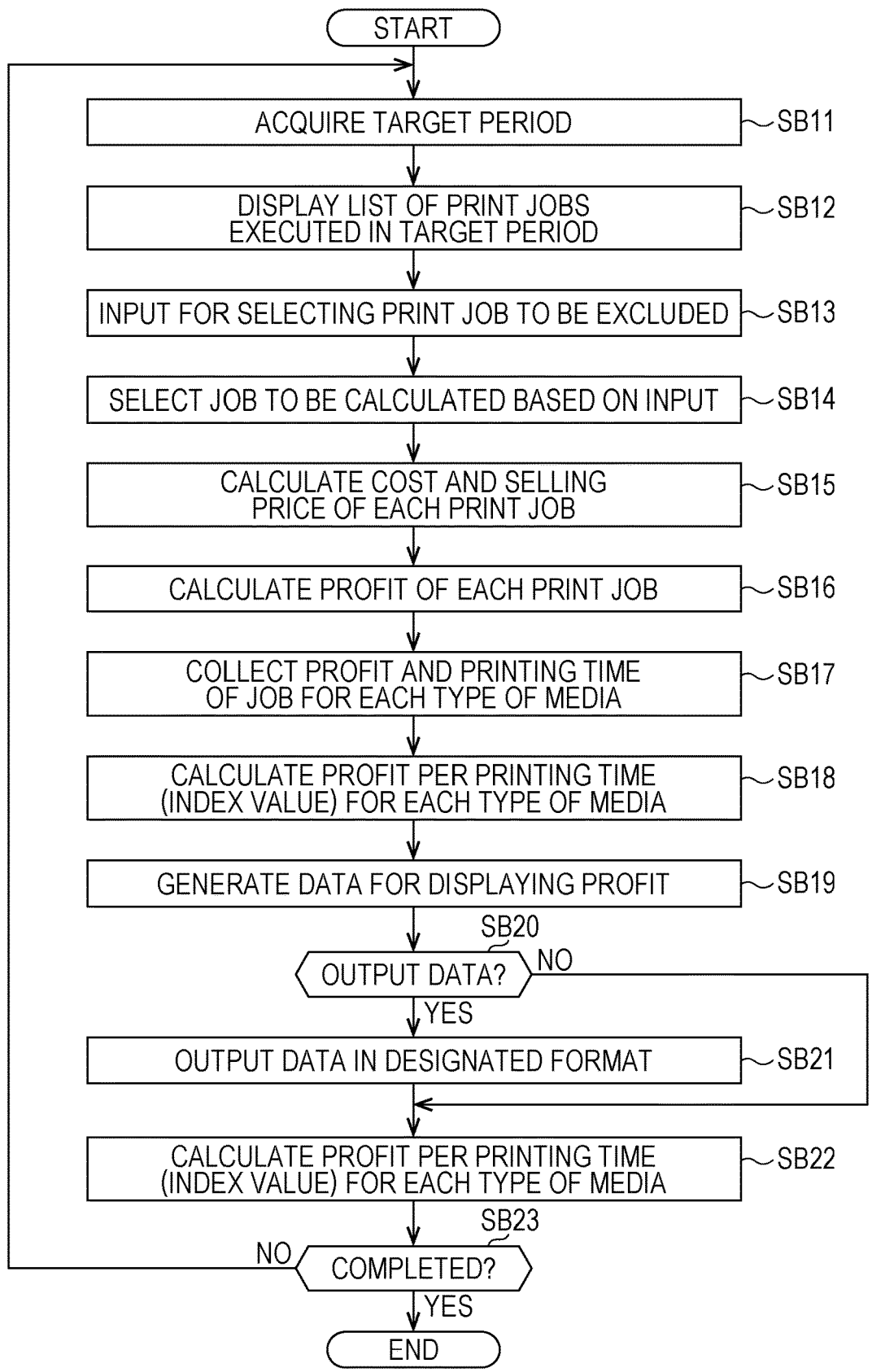
FIG. 11 is a flowchart showing the operation of the management server.

The except setting section 369 is an input unit for designating whether or not each print job on which information is displayed in the job information display section 360 is to be analyzed (FIG. 11). The designation unit 214 receives an input to the except setting section 369 and designates a print job to be analyzed according to the received input.

For the management server 200, any one of a method of designating a print job to be analyzed and a method of designating a print job to be excluded from print jobs to be analyzed (a print job not to be analyzed) may be used. In the embodiment, the user may designate a print job to be excluded from print jobs to be analyzed by an operation of checking the check box 370 in the except setting section 369. That is, the print job to which the check box 370 is checked is excluded from print jobs to be analyzed.

A print job excluded from print jobs to be analyzed is, for example, a print job for which revenue could not be generated from the product. Factors for which revenue could not be generated include various factors such as a human error, a malfunction of an apparatus other than the printer 120, and an error of the printer 120. Examples in which revenue may not be generated from the product include an example in which a product is not goods due to mistakes or defects in post-processing in a case where the product is subjected to post-printing processing (so-called post-processing) such as lamination processing on the product. There are considered a case where an image or text different from the ordered product is printed due to mistakes in order management, a case where defective goods are generated due to being strict on inspection standards, and a case where the print job is canceled as a "Canceled" or "Aborted".

The management server 200 may automatically designate a print job to be excluded from print jobs to be analyzed based on the status of the print job using the control unit 210. However, among the normally completed print jobs, there are print jobs for which revenue may not be generated as described above. Therefore, the management server 200 according to the embodiment may designate a print job to be excluded from print jobs to be analyzed using the job information display section 360.

FIG. 11 is a flowchart showing operations of the management server 200, and illustrates analysis processing executed by the control unit 210.

The control unit 210 acquires a target period designated in the printer designation section 353 (FIG. 9) (step SB11), and causes the job information display section 360 (FIG. 9) to display a list of print jobs executed in the target period (step SB12).

The control unit 210 receives an input for selecting a print job to be excluded from print jobs to be analyzed (step SB13), and the designation unit 214 selects a print job of which a selling price is to be calculated based on the input (step SB14).

The calculation unit 215 calculates the cost and selling price of each print job selected in step SB14 (step SB15). The calculation unit 215 may calculate at least the total cost and calculate the ink cost, the medium cost, and other costs in step SB15. The calculation unit 215 calculates the selling price based on the type of medium, the medium size, and the medium usage for the print job stored in the print job DB 225 and the selling price included in the medium unit price information 223.

The calculation unit 215 calculates a profit of each print job selected in step SB14 (step SB16). The calculation unit 215 obtains a difference between the total cost of each print job calculated in step SB15 and the selling price, as the profit of the print job.

The calculation unit 215 collects the profit obtained in step SB16 and the printing time in which the print job was executed, for each type of media (step SB17). In step SB17, the calculation unit 215 collects the profit and the printing time corresponding to the setting category of the selling price. Therefore, in the medium unit price information 223, in a case where the selling price is set for each type of media regardless of the medium size, the calculation unit 215 collects the profit and the printing time for each type of media. In the medium unit price information 223, in a case where the selling price is set for each medium size and for each type of media, the calculation unit 215 calculates the profit and the printing time for each medium size and for each type of media.

The calculation unit 215 calculates an index value of profit per printing time for each type of media (step SB18). The index value of profit per printing time is an average value of profits per operation time obtained by dividing an amount of money of the sum of profits of a plurality of print jobs by the sum of the printing times (execution times) of the printers 120 of these print jobs.

The process of step SB18 is executed corresponding to the selling price setting category as in step SB17. In the case where the selling price is set for each type of media regardless of the medium size, the calculation unit 215 calculates an index value of profit for each type of media. In the medium unit price information 223, in a case where the selling price is set for each medium size and for each medium type, the calculation unit 215 calculates the index value of profit for each medium size and for each type of media calculate.

The output control unit 216 generates data for display profit to display the index value of profit (step SB19).

Here, the output control unit 216 determines whether or not to output the data generated in step SB19 to the outside (step SB20). For example, in a case where the data for displaying profit are preset to be output from the I/F 205 or the communication unit 206 (step SB20, "Yes"), the output control unit 216 outputs the data for displaying profit as data in a predetermined format (step SB21). Thereafter, the output control unit 216 performs displaying based on the data for displaying profit using the display unit 204 (step SB22).

In a case where the data for displaying profit is not output (step SB20, "No"), the output control unit 216 proceeds to step SB22 to display the screen.

The control unit 210 determines whether or not to end the analysis processing (step SB23) and in a case where the analysis processing is not completed (step SB23, "No"), the control unit 210 returns to step SB11. In a case where the analysis processing is completed (step SB23, "Yes"), the data generated in step SB19 is saved and the processing is ended.

In steps SB17 and SB18, the calculation unit 215 may calculate a profit of the print job, a printing time, and an index value of profit per printing time in a category different from the setting category of the selling price. For example, in a case where the selling price is set for each medium size and for each type of media, the calculation unit 215 may calculate a profit of a print job, a printing time, and an index value of profit for each type of media regardless of the medium size.

Figure 12:
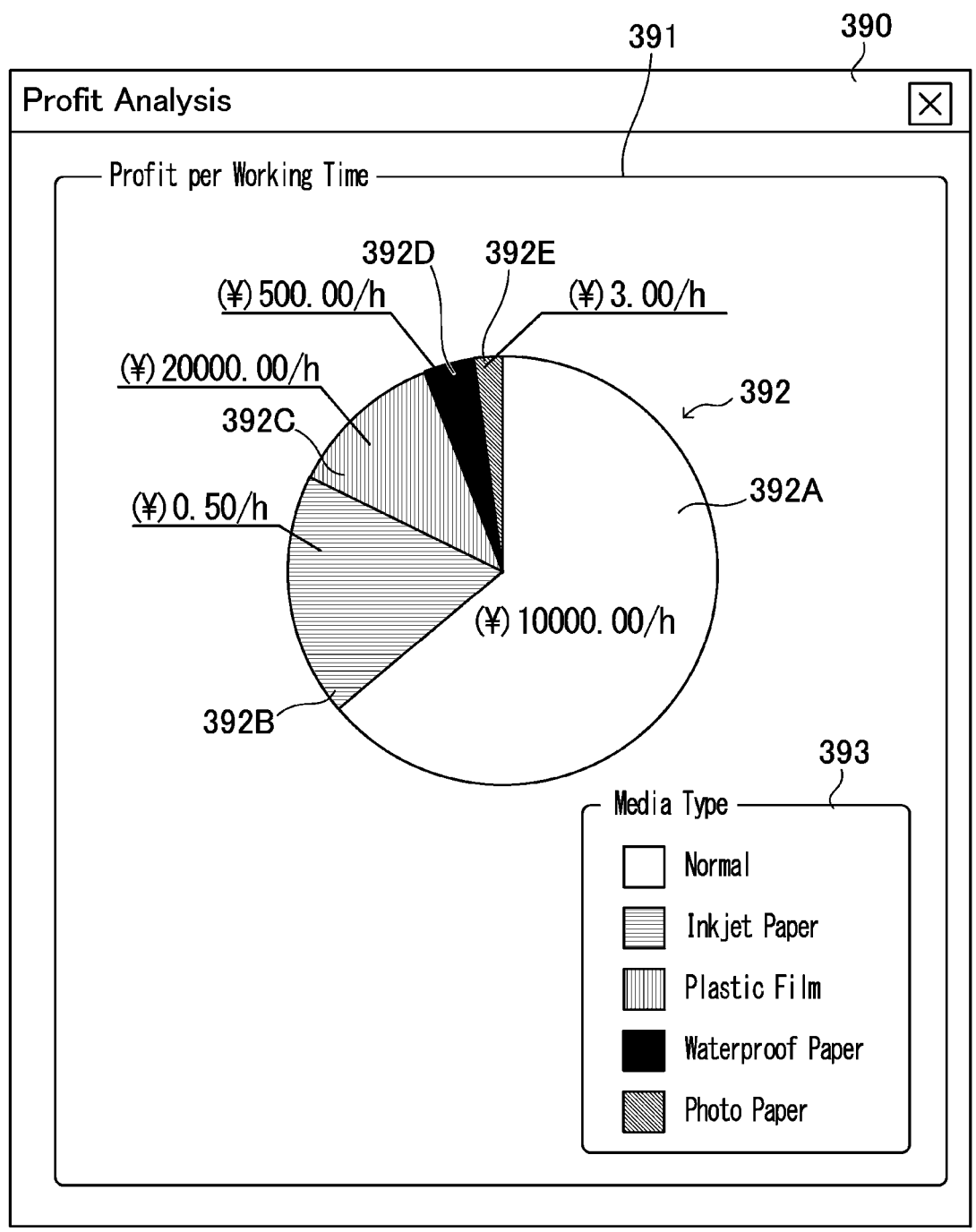
FIG. 12 is a diagram showing a profit analysis result screen as a display example of the management server.

FIG. 12 is a diagram showing a profit analysis result screen 390 as a display example of the management server 200.

The profit analysis result screen 390 is displayed under the control of the control unit 210 as a screen for displaying the index value of profit for each type of media calculated by the analysis processing in FIG. 11.

The profit analysis result screen 390 includes an analysis result display section 391 for displaying the index value of profit for each type of media. In the example of FIG. 12, an index value display section 392 for displaying the index value of profit for each type of media in a chart (in this case, a pie chart) is disposed in the analysis result display section 391. In the analysis result display section 391, a media type display section 393 indicating the types of media in the index value display section 392 is displayed.

The pie chart of the index value display section 392 is a graph for categorizing the printing time of the printer 120 that executed a print job to be analyzed for each type of media. An area 392A of the pie chart indicates a ratio of the printing time, in which a plain paper (Normal) is printed, out of the total printing time of the printer 120. Similarly, an area 392B indicates a ratio of the printing time, in which an ink jet paper (Inkjet Paper) is printed, out of the total printing time of the printer 120. An area 392C indicates a ratio of the printing time, in which a resin film (Plastic Film) is printed, and an area 392D indicates a ratio of the printing time, in which a waterproof paper is printed, out of the total printing time of the printer 120. An area 392E indicates a ratio of the printing time, in which a photo paper (Photo Paper) is printed, out of the total printing time of the printer 120.

In the areas 392A to 392E corresponding to the types of the media, index values of profit calculated corresponding to types of the media in the step SB18 are displayed, respectively. In the example of FIG. 12, the index value of profit of the plain paper is 10000.00 yen/h, the index value of profit of the ink jet paper is 0.50 yen/h, and the index value of profit of the resin film is 20000.00 yen/h. The index value of profit of the waterproof paper is 500.00 yen/h, and the index value of profit of the photo paper is 3.00 yen/h.

In this manner, it is possible to provide useful information for a business that earns an income from the product of the printer 120, by displaying profit (index value) that is expected to be obtained according to the operation time of the printer 120 together with the ratio of the operation time in a chart or the like.

The control unit 210 may execute the analysis processing shown in FIG. 11 for each printer 120, but may collectively execute analysis processing corresponding to a plurality of printers 120. In this case, the control unit 210 may simultaneously output index values of profit calculated regarding the plurality of printers 120. For example, the profit index values of a plurality of printers 120 may be simultaneously displayed on the profit analysis result screen 390 illustrated in FIG. 12. Furthermore, another chart for comparing the index values of profit of the plurality of printers 120 may be displayed on the profit analysis result screen 390.

As described above, the management server 200, to which the invention is applied, includes an acquisition unit 213 and a calculation unit 215. The acquisition unit 213 acquires information including, at least, the medium price per unit area of one or more types of print media and the consumption amount of one or more types of inks, regarding the print job executed by the printer 120. The calculation unit 215 calculates the cost of the print job based on the medium price and the consumption amount included in the information acquired by the acquisition unit 213. The calculation unit 215 calculates an index value of profit obtained by executing the print job, of which a product is a predetermined print medium, based on the cost of the print job by the printer 120 for a predetermined time.

According to the information processing apparatus and the management server 200 to which the information processing method of the invention is applied, it is possible to calculate the index value corresponding to the product of the printer 120 and the operation time of the printer 120. The index value is useful information for estimating profit in a case where a printed product is used as a commercial material. Therefore, it is possible to support work or processing for estimating the profit by providing useful information in a case where a printed product is used as a commercial material.

The calculation unit 215 calculates the average value of profits per operation time of the printer 120 in a case where the print job is executed, as the index value. As a result, it is possible to provide more useful information by calculating the average value of profits per operation time of the printer 120.

The calculation unit 215 calculates the index value based on the selling price of the product. As a result, it is possible to provide information allowing improvement of the estimation accuracy of profit, as the index value. By using the index value, it is possible to estimate profit with high accuracy.

The management server 200 also has a storage unit 220 including a print job DB 225 that is configured to store the information acquired by the acquisition unit 213. The management server 200 includes a designation unit 214 for performing a designation as to whether or not to use the information of the print job DB 225 stored in the storage unit 220 as a target for calculating the selling price of the product for each print job. The calculation unit 215 selects the print job to be calculated according to designation by the designation unit 214, and calculates the index value based on the information about the selected print job. As a result, since it is possible to select a print job to be reflected in the printing cost among the print jobs executed by the printer 120, it is possible to obtain the index value according to the intention of the user or the like that estimates the profit. As a result, it is possible to estimate the profit corresponding to the user's intention in the case where the printed product is used as a commercial material.

The management server 200 includes an input unit 201 that is configured to receive an input. The designation unit 214 designates a print job not to be used for calculating the index value based on the input received at the input unit 201, and the calculation unit 215 calculates another print job excluding the print job designated by the designation unit 214, as a print job to be calculated. As a result, among the print jobs executed by the printer 120, a print job not to be reflected in the printing cost may be designated according to the input. As a result, it is possible to estimate the profit by reflecting the intention of the user or the like more clearly in the case where the printed product is used as a commercial material.

The calculation unit 215 calculates the index value for each type of print media. As a result, since the index value is calculated for each type of print media used for printing, by using the index value, it is possible to estimate the profit corresponding to the type of the product in detail. Therefore, it is possible to provide more useful information about work or processing for estimating profit.

The acquisition unit 213 acquires information including the operation time of the printer 120 on the print job executed by the printer 120. The calculation unit 215 calculates the operation time for each type of print media in a predetermined period based on the information acquired by the acquisition unit 213, regarding the print job executed by the printer 120 in the predetermined period. As a result, the operation time of the print job by the printer 120 is calculated for each type of print media. Therefore, it is possible to accurately estimate the profit obtained by the printer 120 by using this information, in a case where the printer 120 performs printing on a plurality of print media. Therefore, it is possible to more effectively support work or processing for estimating the profit in the case where the printed product is used as a commercial material.

The management server 200 also has an output unit 203 that outputs the index value for each type of print media calculated by the calculation unit 215 and the operation time for each type of print media in a format associated with the type of print medium. As a result, since the information such as the index value is outputted in a format in association with the type of print medium, it is possible to more easily and easily obtain the profit in a case where the printed product is used as the product based on the output information You may estimate.

The output unit 203 outputs an image including a categorized state obtained by categorizing an operation time for each type of print media on the print job executed by the printer 120 in a predetermined period and an index value corresponding to each of categorized times, or outputs display information for displaying the image. As a result, it is possible to display detailed information reflecting the operation time of the printer 120 and the type of print medium, as an image. Therefore, it is possible to more effectively support work or processing for estimating the profit in a case where the printed product is used as a commercial material.

Figure 13:
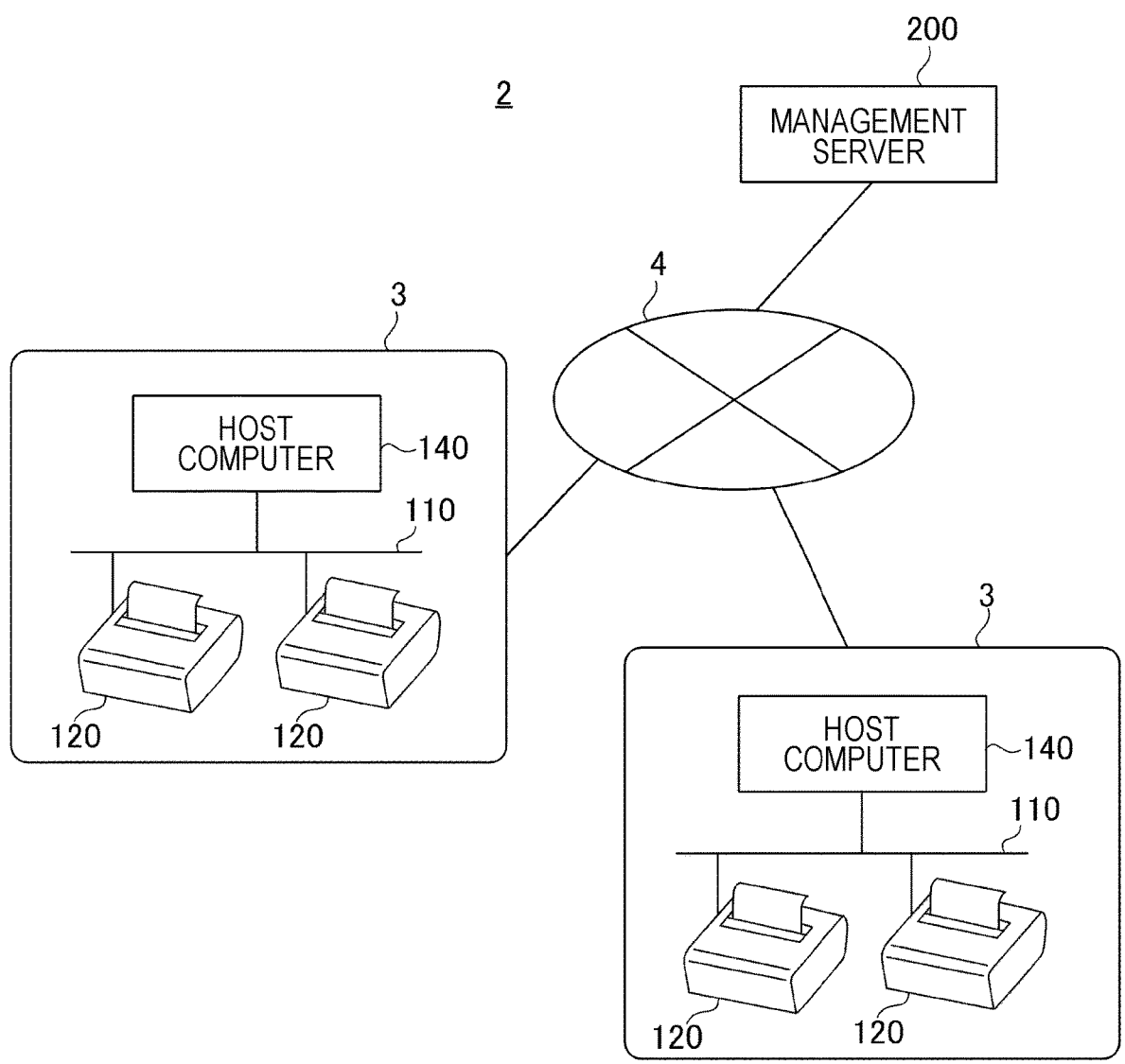
FIG. 13 is a diagram showing another configuration example of the management system.

The management server 200 according to the invention is also applicable to a larger-scale system, and an example thereof is shown in FIG. 13.

5. Modification Example of Management System

FIG. 13 is a diagram showing the configuration of the management system 2 as another configuration example of the management system 1.

The management system 2 is configured such that the local network 3, to which the printer 120 and the host computer 140 are connected through the network 110, is connected to the management server 200. The management server 200 is connected to a plurality of local networks 3 through a wide area network 4 such as the Internet, and may communicate with the printers 120 constituting each local network 3.

In the management system 2 shown in FIG. 13, the management server 200 performs management on the print job executed by each printer 120, acquires print job information, and builds a print job DB 225.

In such a configuration, for example, even if a user managing the local network 3 may request an administrator managing the management server 200 to provide information such as an index value of profit for each type of media in the printer 120. In this case, the administrator may generate the data for displaying profit by the management server 200, and transmit the generated data to the host computer 140. As a result, in the host computer 140, the user managing the local network 3 may view the index value and the like of profit for each type of media in the printer 120 in a chart and the like.

The above-described embodiments merely illustrate one embodiment of the invention, and may be optionally modified and applied within the scope of the invention.

For example, there is provided a configuration such that the index value of profit obtained by operating the printer 120 is the average value of profits per operation time for each type of print media, as an example. The profit may be obtained by collecting the selling price weighted by the print job and the cost of the print job, and the index value of profit may be obtained by other statistical processing.

An output form of the index value of profit by the output unit 203 is not limited to the profit analysis result screen 390 shown in FIG. 12. As another example of the output form, there are various forms such as a bar chart with the operation time being set on an axis, coordinates with the operation time and profits per operation time being set on a vertical axis and a horizontal axis, and a chart in a table form. It is also possible to output the index value of profits per operation time, which is categorized according to the type of print medium and the size of the print medium.

For example, a method of designating a print job to be analyzed or a print job to be excluded from print jobs to be analyzed using the designation unit 214, which is executed by the management server 200, is not limited to the above-described method. To the management server 200, data or command to designate a print job to be analyzed or a print job to be excluded from print jobs to be analyzed from another apparatus (for example, the host computer 140) is transmitted, and thus designating may be performed. In this case, the designation unit 214 performs designating in response to a command or data. According to a preset rule, the designation unit 214 may designate a print job to be analyzed or a print job to be excluded from print jobs to be analyzed. The management server 200 may read data designating a print job to be analyzed or a print job to be excluded from print jobs to be analyzed, and the designation unit 214 may collectively perform designating based on the data.

For example, in the above-described embodiments, there is described an example in which the ink cost, the medium cost, and other costs are calculated as the cost of the print job, but the invention is not limited thereto. For example, the cost of post-processing performed on the product may be included in the cost of the print job. The cost of the main body of the printer 120 may be included in the cost of the print job. Various costs regarding the maintenance operation of the printer 120, such as management by the management server 200, may be included in the printing cost. The cost of the print job may be limited to ink cost and/or media cost.

Although the operation time of the printer 120 regarding the print job has been described as a time in which the print job is executed, a time for a maintenance operation such as flushing or cleaning executed during the execution of the print job or between print jobs may be included in the operation time. In this case, the time required for flushing, cleaning, or the like may be reflected on the graph or the like of the index value display section 392 (FIG. 12). The time required for the maintenance operation performed during the execution of the print job may be excluded from the execution time of the print job. In this case, after obtaining the execution time of the print job from the start time and the completion time of the print job information transmitted from the printer 120, the management server 200 may obtain the execution time of the print job excluding the time of the maintenance operation. In this case, the information about the time required for the maintenance operation may be included in the print job information transmitted from the printer 120.

For example, the cost of some of expendable items used by the printer 120 may be excluded from the cost of the print job, for example, ink of some colors may be excluded from the processing of calculating the ink cost.

In the embodiment, there is described an example in which the printer 120 is an ink jet printer, but the invention is not limited thereto. Like the printer 120, the management server 200 may be connected to various printers such as a dot impact type, a thermal sublimation type, a thermal type, and a printer incorporated in another apparatus (for example, a multifunction apparatus). In this case, according to the printing method and specification of each printer, the management server 200 may manage the type and unit price of expendable items of each printer in unit price information 221.

The functions of the management server 200 may be integrated into other computers, for example, the host computer 140 may have a function of the management server 200. The printer 120 may execute various processing described as a function of the management server 200. The functions of the management server 200 may be realized by a plurality of server apparatuses and computers, and for example, the management server 200 may be configured as a cloud server by a cloud computing technology.

The type, the size, the unit price, the selling price, and the like of the print medium described and illustrated in the embodiment are merely examples, the number of types and sizes of print media is optional, and the categorization, in which the selling price is set, may be also changed appropriately.

For example, each functional block shown in FIG. 1 may be optionally realized by cooperation between hardware and software, and does not suggest a specific hardware configuration. The management server 200 may execute various operations by executing a program stored in a storage medium externally connected.

What is claimed is:

1. An information processing method, comprising:
acquiring information including, at least, a medium price per unit area of one or more types of print media and a consumption amount of one or more types of inks, regarding a print job executed by a printing apparatus;
storing the acquired information in a storage unit;
receiving an input;
performing a designation as to whether or not to use the information stored in the storage unit as a target for calculating a selling price of a product for each print job, the designation including designating a print job not to be used for calculating the index value based on the input;
selecting another print job excluding the designated print job, as a print job to be calculated;
calculating a cost of the selected print job based on the medium price and the consumption amount included in the acquired information;
calculating an index value of a profit obtained by executing the selected print job, of which the product is a predetermined print medium, by the printing apparatus for a predetermined time,
wherein calculating the index value is based on the calculated cost, the stored information about the selected print job, and the selling price of the product; and
outputting an image including a categorized state obtained by categorizing an operation time for each type of print media on the print job executed by the printing apparatus in a predetermined period and the index value corresponding to each of categorized times, or outputting display information for displaying the image.

2. The information processing method of claim 1, further comprising:
calculating the index value for each of the one or more types of print media.

3. The information processing method of claim 1, further comprising:
determining the selling price of the product of the print job based on the print medium of the print job.

4. The information processing method of claim 3, further comprising:
receiving inputs for one or more types of print media regarding selling prices of the one or more types of print media; and
setting the selling prices of the one or more types of print media according to the received inputs,
wherein determining the selling price of the product of the print job based on the print medium of the print job comprises using the set selling price of the print medium of the print job.

5. An information processing apparatus, comprising:
a communication unit that is configured to receive information regarding a print job executed by the printing apparatus;
an acquisition unit that is configured to acquire information including a medium price per unit area of a print medium included in the received information and an ink consumption amount;
a calculation unit that is configured to calculate a cost of the print job based on the medium price and the consumption amount included in the information acquired by the acquisition unit;
a storage unit that is configured to store the information acquired by the acquisition unit;
a designation unit that is configured to perform a designation as to whether or not to use the information stored in the storage unit as a target for calculating a selling price of a product for each print job; and
an input unit that is configured to receive an input,
wherein the calculation unit is further configured to:
calculate an index value of profit obtained by executing the print job, of which the product is a predetermined print medium, based on the cost of the print job by the printing apparatus for a predetermined time,
calculate the index value based on the selling price of the product, and
select a print job to be calculated according to designation by the designation unit, and calculate the index value based on the information about the selected print job,
the designation unit is further configured to designate a print job not to be used for calculating the index value based on the input received at the input unit, and
the calculation unit is further configured to select another print job excluding the print job designated by the designation unit, as the print job to be calculated.

6. The information processing apparatus according to claim 5, wherein the calculation unit is further configured to calculate, as the index value, an average value of profits per operation time of the printing apparatus in a case where the printing apparatus executes the print job.

7. The information processing apparatus according to claim 5, wherein the calculation unit is further configured to calculate the index value for each type of print media.

8. The information processing apparatus according to claim 7,
wherein the acquisition unit is further configured to acquire the information including an execution time in which the print job is executed by the printing apparatus, and
the calculation unit is further configured to calculate the execution time for each type of print media in a predetermined period based on the information acquired by the acquisition unit, regarding the print job executed by the printing apparatus in the predetermined period.

9. The information processing apparatus according to claim 8, further comprising:
an output unit that is configured to output the index value for each type of print media and the execution time for each type of print media calculated by the calculation unit in a format in association with the type of the print medium.

10. The information processing apparatus of claim 5:
wherein the calculation unit is further configured to determine the selling price of the product of the print job based on the print medium of the print job, and to calculate the index value based on the determined selling price.

11. The information processing apparatus of claim 10:
wherein the acquisition unit is further configured to receive inputs for one or more types of print media regarding selling prices of the one or more types of print media, and set the selling prices of the one or more types of print media according to the received inputs, and
the calculation unit is further configured to determine the selling price of the product of the print job based on the print medium by using the set selling price of the print medium of the print job.

12. The information processing apparatus of claim 5:
wherein the calculation unit is further configured to determine the selling price of the product of the print job based on the print medium of the print job, and to calculate the index value based on the determined selling price.

13. The information processing apparatus of claim 12:
wherein the acquisition unit is further configured to receive inputs for one or more types of print media regarding selling prices of the one or more types of print media, and set the selling prices of the one or more types of print media according to the received inputs, and
the calculation unit is further configured to determine the selling price of the product of the print job based on the print medium by using the set selling price of the print medium of the print job.

14. An information processing apparatus, comprising:
a communication unit that is configured to receive information regarding a print job executed by the printing apparatus;
an acquisition unit that is configured to acquire information including a medium price per unit area of a print medium included in the received information and an ink consumption amount;
a calculation unit that is configured to:
calculate a cost of the print job based on the medium price and the consumption amount included in the information acquired by the acquisition unit;
calculate an index value of profit obtained by executing the print job, of which a product is a predetermined print medium, based on the cost of the print job by the printing apparatus for a predetermined time; and calculate the index value for each type of print media; and an output unit configured to output an image including a categorized state obtained by categorizing an operation time for each type of print media on the print job executed by the printing apparatus in a predetermined period and the index value corresponding to each of categorized times, or to output display information for displaying the image.

15. The information processing apparatus of claim 14:

wherein the calculation unit is further configured to determine a selling price of the product of the print job based on the print medium of the print job, and to calculate the index value based on the determined selling price.

16. The information processing apparatus of claim 15:

wherein the acquisition unit is further configured to receive inputs for one or more types of print media regarding selling prices of the one or more types of print media, and set the selling prices of the one or more types of print media according to the received inputs, and the calculation unit is further configured to determine the selling price of the product of the print job based on the print medium by using the set selling price of the print medium of the print job.

\* \* \* \* \*